United States Patent
Grosvenor et al.

(10) Patent No.: US 6,847,379 B2
(45) Date of Patent: Jan. 25, 2005

(54) DISPLAY OF STATIC DIGITAL IMAGES

(75) Inventors: David Arthur Grosvenor, Bristol (GB); David Neil Slatter, Bristol (GB); Shane Dickson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 10/270,315

(22) Filed: Oct. 15, 2002

(65) Prior Publication Data

US 2003/0080974 A1 May 1, 2003

(30) Foreign Application Priority Data

Oct. 13, 2001 (GB) .............................. 0124673

(51) Int. Cl.⁷ .............................. G09G 5/00; G06K 9/34
(52) U.S. Cl. ...................... 345/619; 345/700; 345/723; 382/171; 382/173
(58) Field of Search ................................. 382/164, 170, 382/174, 173, 218, 219, 171, 295, 293, 284, 312; 345/619, 620, 622, 624, 628–630, 700, 723, 661, 678, 719, 722, 725; 348/21–26, 134–135

(56) References Cited

U.S. PATENT DOCUMENTS

| 5,872,859 A | 2/1999 | Gur et al. ................... 382/128 |
|---|---|---|
| 6,026,179 A | 2/2000 | Brett ........................... 382/162 |
| 6,584,221 B1 * | 6/2003 | Moghaddam et al. ....... 382/165 |
| 2002/0102018 A1 * | 8/2002 | Lin et al. ..................... 382/165 |
| 2003/0053673 A1 * | 3/2003 | Dewaele ...................... 382/132 |

FOREIGN PATENT DOCUMENTS

| FR | 2 751 109 | 1/1998 |
|---|---|---|
| JP | 2000-350701 | 12/2000 |
| WO | 01/67491 | 9/2001 |

* cited by examiner

Primary Examiner—Matthew C. Bella
Assistant Examiner—Mesner Sajous
(74) Attorney, Agent, or Firm—Foley & Lardner LLP

(57) ABSTRACT

The present invention provides a computer system (2) for determining regions of interest in a static digital image for display on a display device, the system comprising a processor (4) configured to compare parts of an image (20, 50) with characteristics at least one region of interest specified by a user (19) and to determine at least one region of interest in an image (20, 50) based at least in part on the degree of similarity between parts of the image and the at least one user-specified region of interest in which the at least one user-specified region of interest is specified from the same image as the image in relation to which the determination is made.

13 Claims, 5 Drawing Sheets

DISPLAY OF STATIC DIGITAL IMAGES

FIELD OF THE INVENTION

The present invention relates to computer systems for determining regions of interest in static digital images, apparatus for the display of static digital images and to corresponding methods.

BACKGROUND TO THE INVENTION

When viewing static digital images in electronic form, problems can arise due to a mismatch between the resolution of the image and the resolution of the viewing device. Three situations can exist, as listed below:
1. The image being viewed is of a lower resolution than the viewing device.
2. The image being viewed and the viewing device have equal resolutions.
3. The image being viewed is of a higher resolution than the viewing device.

In the trivial case of situation 2 above, no resolution mismatch based problems arise.

In the case of situation 1, if the image is increased in size to occupy more of the viewing device, problems can arise as individual pixels become evident in the image viewed. However, given the resolution of modern digital cameras and images digitised using modern scanners, situation 3 is much more likely. Such a case arises when a low resolution device, such as a television screen, is used to view images captured using typical modern digital image capture devices, such as cameras and scanners. Resizing the image to be viewed in its entirety using the viewing device results in the loss of much of the detail potentially present in the image.

To overcome this limitation, and with a view to enhancing the interest of the presentation of images, in our co-pending United Kingdom patent application no. GB 0104589.7, the content of which is incorporated herein by reference, an automatic rostrum camera technique is disclosed for viewing static digital images. In this technique, regions of interest from an image are selected automatically by a processor and displayed as a series of images. Alternatively, in our co-pending United Kingdom patent application no. 0116877.2, the content of which is incorporated herein by reference, an automatic selection is made of an area of interest and the image zooms on to this selection. In both these cases, assumptions are made regarding generic properties of regions of interest in the image. These are used automatically to determine regions of interest in an image using machine vision techniques known in the art.

However, such a method of displaying images is inflexible and takes little or no account of user preferences.

It is an aim of preferred embodiments of the present invention to obviate or overcome a problem associated with the prior art, whether referred to herein or otherwise.

SUMMARY OF THE INVENTION

According to the present invention in a first aspect, there is provided computer system for determining regions of interest in a static digital image for display on a display device, the system comprising a processor configured to compare parts of an image with characteristics of at least one region of interest specified by a user and to determine at least one region of interest in the image based at least in part on the degree of similarity between regions of the image and the at least one user-specified region of interest, in which the at least one user-specified region of interest is specified from the same image as the image in relation to which the determination is made.

Suitably, the at least one user-specified region of interest is specified by a user defining a border of a region of interest.

Suitably, the at least one user-specified region of interest is specified by a user selecting at least one region of interest type from a plurality of available region of interest types.

Suitably, the degree of similarity is determined by projecting at least part of the at least one user-specified region of interest into a feature space and comparing the distance in feature space between the at least one user-specified region of interest with regions of the image in relation to which the determination is to be made.

Suitably, a resolution pyramid is formed from the image, which resolution pyramid is segmented at different resolutions.

Suitably, feature vectors are projected in to a feature space.

Suitably, the feature vectors include variables selected from colour, feature and gradient image profiling of the neighbourhood surrounding points in the at least one user-specified region of interest.

Suitably, the degree of similarity is determined according to the response of a face detection system.

According to the present invention in a second aspect, there is provided apparatus for the display of static digital images comprising a computer system according to the first aspect of the invention to determine a region of interest for display and a display device for displaying the region of interest.

According to the present invention in a third aspect, there is provided a method of determining a region of interest in a static digital image for display on a display device, the method comprising the steps of a processor comparing parts of an image with at least one region of interest specified by a user, determining at least one region of interest in an image based at least in part on the degree of similarity between parts of the image and characteristics of the at least one user-specified region of interest the at least one user-specified region of interest is specified from the same image as the image in relation to which the determination is made.

According to the present invention in a fourth aspect, there is provided a method of displaying a static digital image, which method comprises the steps of determining a region of interest in an image according to the third aspect of the present invention and displaying the region of interest.

BRIEF DESCRIPTION OF THE DRAWINGS

The present invention will now be described, by way of example only, with reference to the drawings that follow; in which.

DESCRIPTION OF THE PREFERRED EMBODIMENTS

Figure 1:
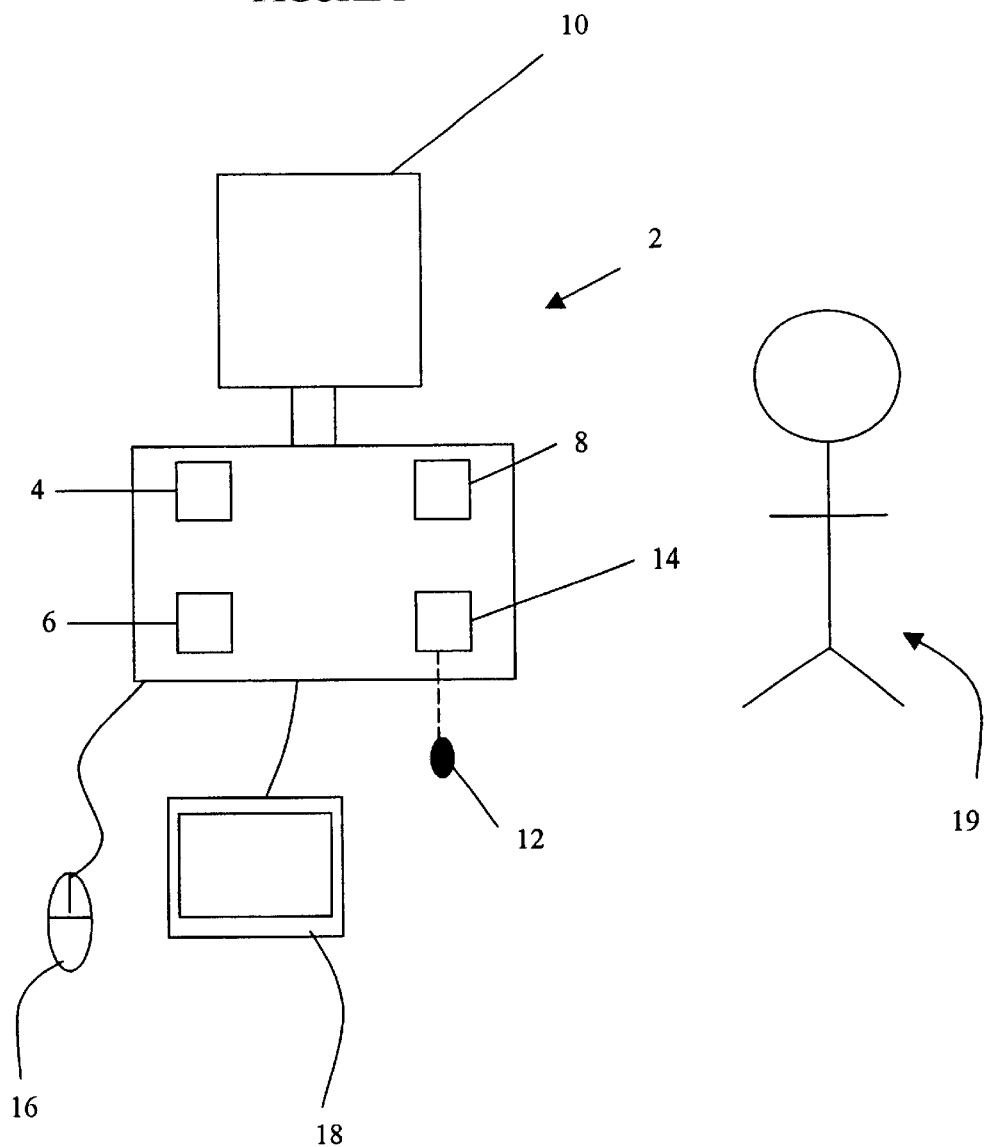
FIG. 1 is a schematic illustration of an apparatus for viewing static digital images according to the present invention.

In FIG. 1 of the drawings that follow, there is shown a static digital image display apparatus 2 comprising a processor 4, a memory 6, a display driver 8 and a display device 10. Apparatus 2 can receive digital image data from a data source 12 via an input 14. Data from data source 12 for a static digital image is loaded into memory 6, for instance from a digital camera image, scanner or download, for processing by processor 4, which instructs display driver 8 to display the image on display device 10, which can be a visual display unit, a screen etc. Typically, the apparatus 2 is embodied in a personal computer or a dedicated device. The processor 4 can be configured by software or by hard wired instructions to operate the apparatus according to embodiments of the present invention.

The apparatus 2 further comprises at least one peripheral interface device, such as a mouse 16 and/or keyboard 18 to enable user commands to be given to the apparatus.

Embodiments of the present invention are operable by appropriate computer software running on such a computer system.

Figure 2:
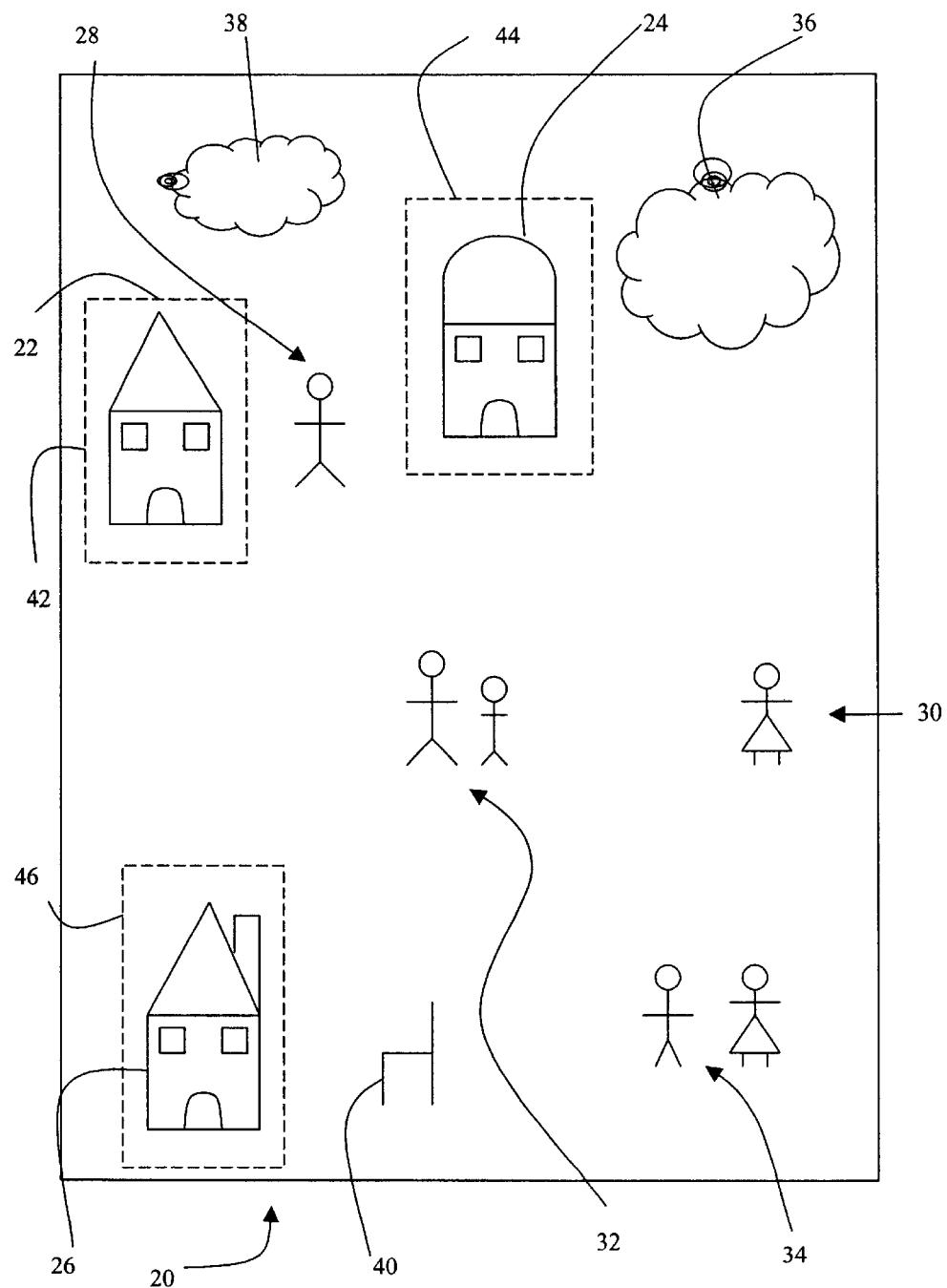
FIG. 2 is a representation of a first static digital image for use with embodiments of the present invention.

Referring to FIG. 2 of the drawings that follow, there is shown an arbitrary static digital image 20. It will be appreciated that the present invention is applicable to any static digital image, this image being used purely for the purpose of explanation of embodiments of the present invention.

In the image 20 are representations of first, second and third houses 22, 24, 26 respectively; first, second, third and fourth people images 28, 30, 32, 34 respectively; a first cloud 36, a second cloud 38 and a chair 40.

Figure 3:
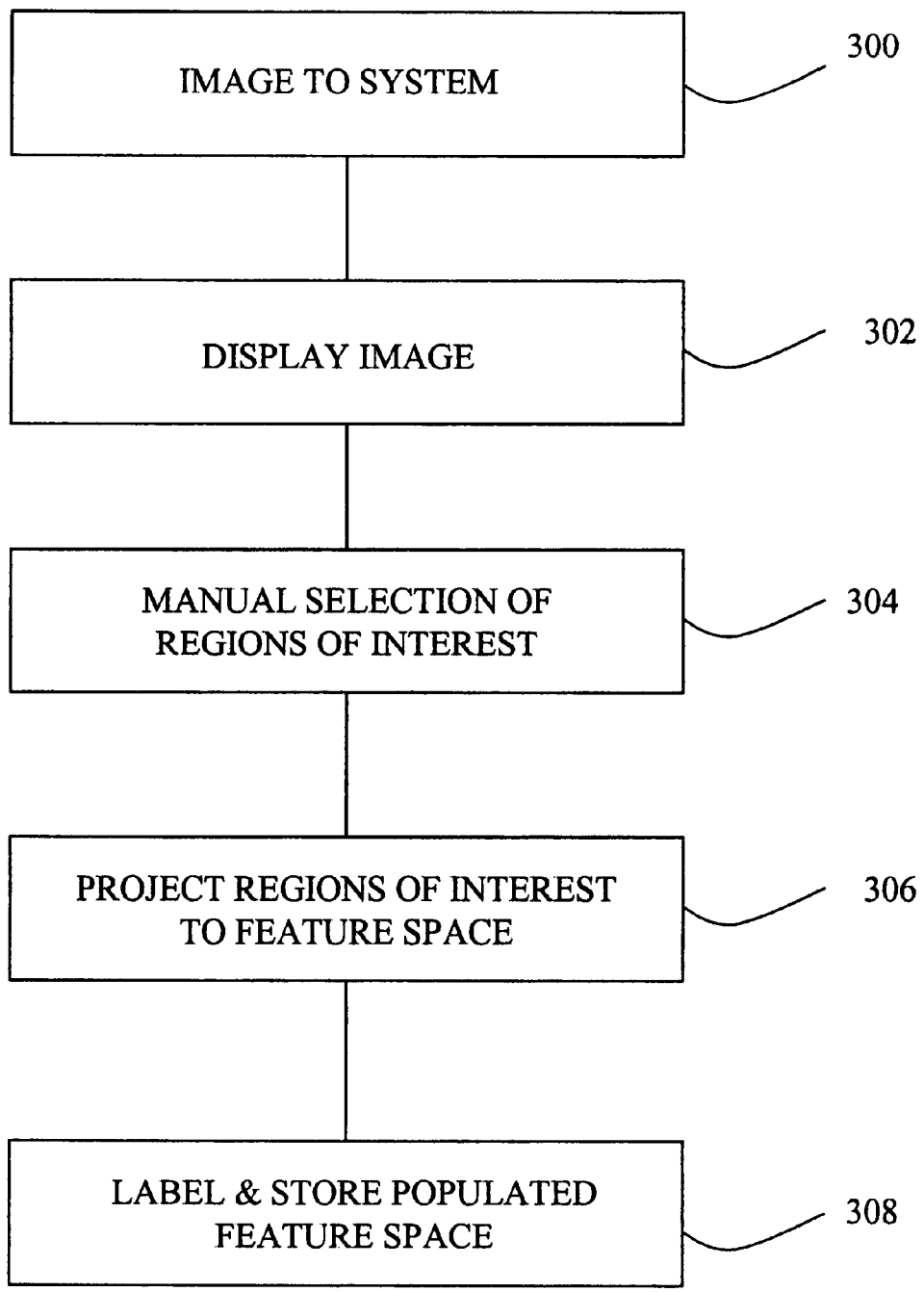
FIG. 3 is a functional flow diagram of part of an embodiment of the present invention.

Referring to FIG. 3, there is shown a functional flow diagram of an embodiment of the present invention. In step 300 static digital image 20 is provided to system 2 via data source 12 and input 14. The image data is stored in memory 6. In step 302 the image 20 is displayed on the display device 10.

In step 304 a user 19 (FIG. 1) makes a manual selection of one or more regions of interest in the image 20 using zoom and translation controls as appropriate. For instance, using a mouse 16, a user could drag a box about a region of interest in image 20 to define a border of a region of interest. Alternatively, a region of interest in the image may be zoomed in on by a point of zoom being specified by a user.

For the purpose of this example, it is assumed that the user is interested in houses or dwellings and regions of interest 42, 44 and 46 (shown by dashed lines in FIG. 2) are selected by the user.

In step 306 the user indicated regions of interest 44, 46, 48 are projected into an n-dimensional feature space by processor 4. To do this, the image 20 is processed by processor 4 to form a resolution pyramid and is segmented at different resolutions. Image and segmentation based features are measured from the regions of interest, across multiple resolutions, using machine vision techniques to generate a feature vector for each respective region of interest 44, 46, 48. The feature vectors involve colour, texture and gradient image profiling of the pixel neighbourhood surrounding points in the regions of interest and of the regions segmented about the points in the regions of interest. Also included in the feature vectors are the response of a face detection system across multiple resolutions. These feature vectors are projected into the feature space.

Thus, the feature space is populated with examplar points of interest based on user preferences.

In step 308 the populated feature space is labelled by the user and stored. The user is invited to select a predetermined file name (e.g. Group 1, Group 2 etc) or state a more descriptive filename (e.g. houses). The populated feature space data is stored in memory 6 using the filename label as a region of interest type. The user may indicate whether the stored region of interest type can be modified subsequently.

Further images may be viewed by a user and regions of interest selected in the same way or further regions of interest may be selected from the same image. If the viewer has indicated that the feature space of a preselected region of interest type cluster may be modified, all of the regions-of-interest in the image selected by the user are examined in feature space to identify the number, location, and composition of clusters that exist (for instance using an algorithm such as that suggested in Frigui H, Krishnapuram R, "A Robust Competitive Clustering Algorithm with Applications in Computer Vision", IEEE PAMI, 10(5), 1999). Regions-of-interest from an image that are added to a cluster that already has a "type" label are used to modify the position of the examplar point-of-interest that represents that "type" cluster. For clusters found that do not already have a "type" label (ie do not fall within the scope of a pre-selected region of interest type), examplar points-of-interest are determined to represent each cluster. These are presented to the viewer who is invited to label the cluster with a label or "type" (as in step 308 of FIG. 3). The resulting feature space containing labelled clusters is saved and can be used when considering a new image. Feature spaces containing labelled clusters can be associated with a group of images, such as those centred around a particular theme, or with all images in the viewers photo album.

Figure 4:
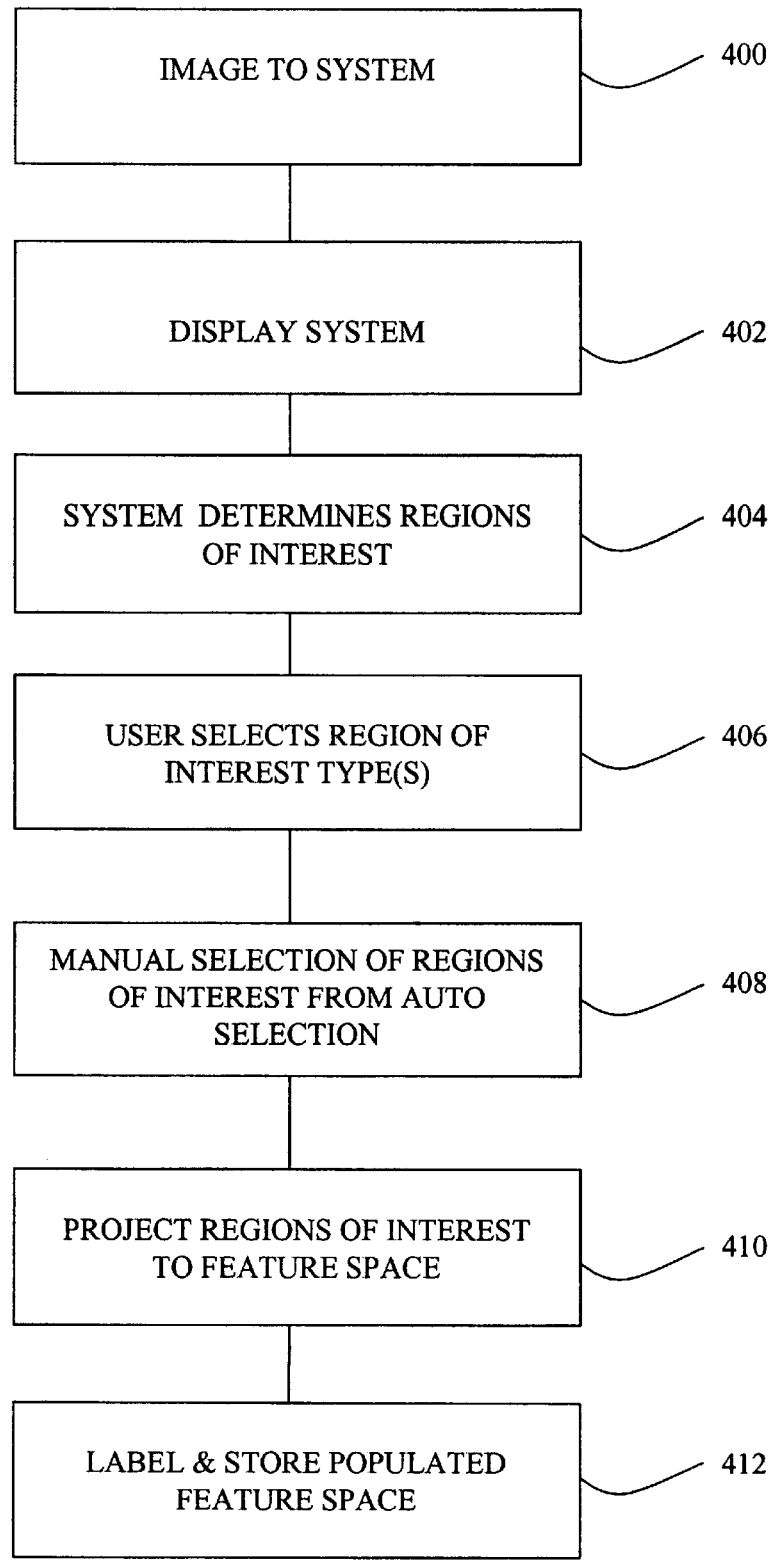
FIG. 4 is a functional flow diagram of part of another embodiment of the present invention.

Referring to FIG. 4 of the drawings that follow, an alternative regions of interest selection method is described. In this case, steps 400 and 402 correspond to steps 300 and 302 in FIG. 3.

In this embodiment, instead of the user defining regions of interest manually there is a semi-automatic selection in which different region of interest types are offered to the user for selection based on pre-stored regions of interest in feature space that have been labelled with a file name. First the user may, optionally, restrict the region of interest types to be displayed from the available stored region of interest types. In step 404 a determination is made of what regions of the image correspond to region of interest types stored in the apparatus 2 (and optionally only those selected by the user) in order to display regions of interest according to type. Then the image is analysed by processor 4 to identify regions of interest (step 404) corresponding to the regions of interest for which the user has a preference. This is carried out iteratively by identifying potential regions of interest and then analysing them further to determine if they fall within a selected region of interest type. Thus, for instance, if a "people" region of interest type (populated with images of people) is selected by the user, the system may first look for regions incorporating flesh-tone and only further consider those areas as against the cluster in feature space corresponding to that type if the flesh tone is found. The region is selected if it is less than a predetermined distance (Euclidean or otherwise)from the closest point corresponding to a region of interest selected by the user (techniques such as that described in Santini S, Jain R, "Similarity Measures", IEEE PAMI, 21(9), 1999 can be used). This can be regarded as a distance from the region of interest type in feature space.

In order to reduce computational load, and decorrelate the features in the feature vector, the dimensionality of the feature space may be reduced via the application of a suitable technique, such as principal component analysis, and operations will take place in the transformed feature space as appropriate. By replacing the points in the image pyramid with the distances measured for each point in feature space as explained above, an "interest map" at multiple resolutions is generated. The centroids of regions of high interest are determined at multiple resolutions from the interest map to determine regions of interest. Those coincident with the points of interest directly indicated by the viewer, or the examplar points of interest representing viewer elected "types", are considered as new regions of interest. In step 406 the user selects a region of interest type, eg houses, people etc from those available on the system. One or more region of interest types may be selected. For instance, in this example the system may have pre-selected region of interest types labelled "houses", "clouds", "people", "trees" and "animals" of which the user selects the first three.

Figure 5:
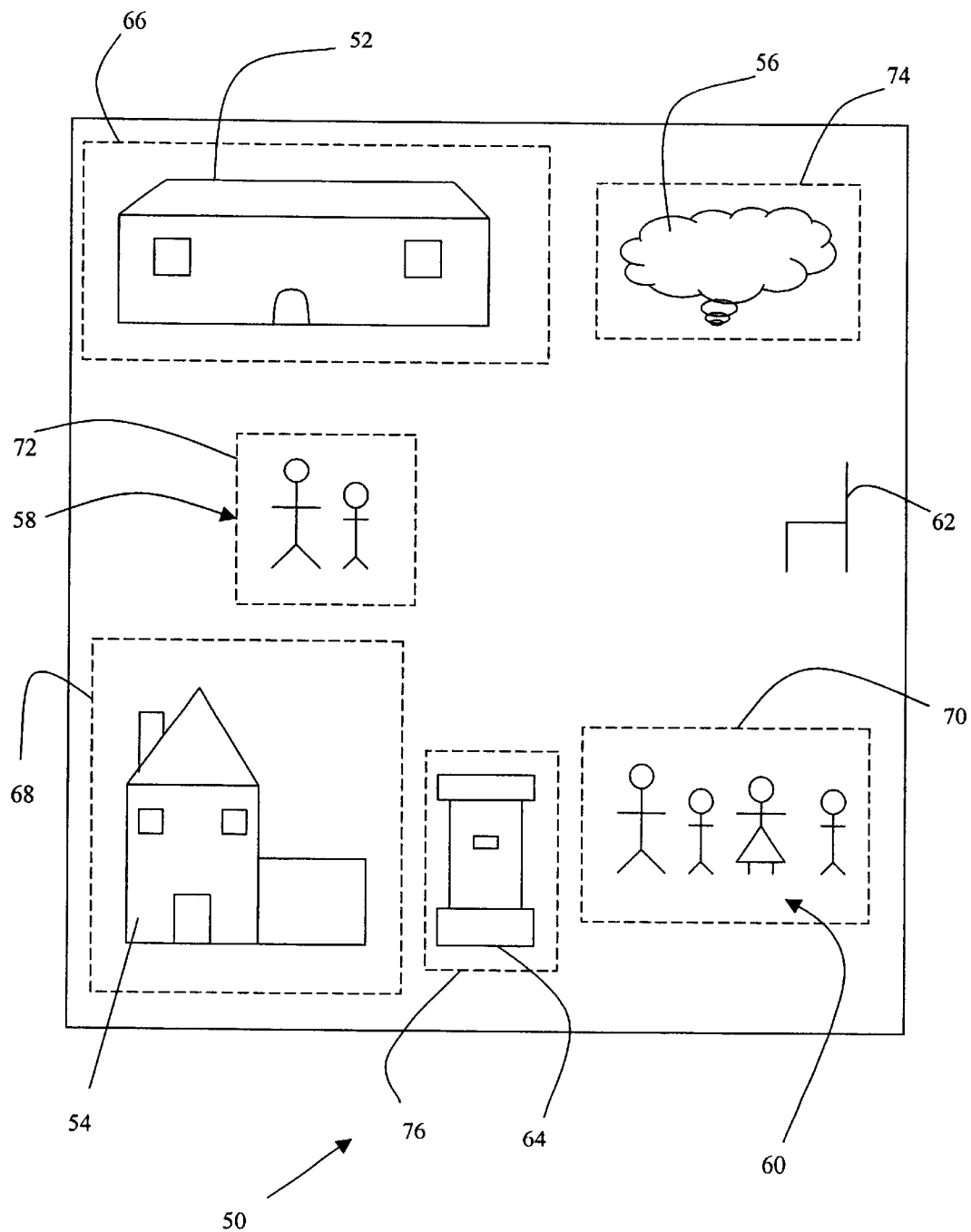
FIG. 5 is a representation of a second static digital image with regions of interest shown.

These types of regions of interest are illustrated in FIG. 5 of the drawings that follow. In FIG. 5 the regions of interest are highlighted by dashed lines. In FIG. 5 are two dwellings 52, 54; a cloud 56; two people groups 58, 60; a chair 62 and a post box 64. Regions of interest 66 and 68 may have been labelled "houses" as a type. Regions of interest 70 and 72 may have been labelled "people" as a type. Region of interest 74 may have been labelled "clouds" as a type. Region of interest 76 is labelled "houses" but see below.

The different types of regions of interest may be differentiated on the display device 10 in a variety of ways. For instance, they may be given different border colours, be highlighted asynchronously, have labels attached (visible by and linked by lead lines, for instance) thereto etc.

The user is then in step 408 invited to select one or more region of interest interest types: "houses", "people" and/or "clouds". The selection may be from a drop down or overlaid list, a touch screen etc. The user may be given the option to delete highlighted regions of interest from a type or add to them. These deletions/additions may, optionally, be used to update the cluster information corresponding to the region of interest type or may simply be deleted/added for this particular display. For instance the post box 64 may have been allocated (incorrectly in this opinion of the user) by the system to the "houses" region of interest type and the user can delete it therefrom to refine that region of interest type. Machine vision analysis of the image has determined that chair 62 does not fall within the predetermined distance from a pre-selected region of interest and therefore it is not highlighted.

The user selection is projected to feature space for analysis as set out above (step 410).

The user selections at this stage can be used to form the basis of a display from this image and/or to refine the population of feature space vectors (step 412). For display, these regions of interest can be passed on to tools implementing image viewing schemes such as those described in our co-pending United Kingdom patent applications numbers: GB 0104589.7 and GB 0116877.2.

Thus, say if a user pre-selects the house dwellings 22, 24, 26 from the first image 20, and selects "houses" regions of interest types dwellings 52 and 54 in second image 50 are identified as being sufficiently similar to the user selected images for display by showing enlarged images thereof in sequence, as taught in our co-pending United Kingdom patent application number: GB 0104589.7.

Thus a close-up or zoomed view of a region of interest is displayed according to the degree of similarity assessment made based on user-specified regions of interest. From the first region of interest other regions of interest may be displayed.

It will be appreciated that although it is convenient for analysis of a user-specified region of interest to take place on the same system as the further analysis of an image to determine (and in some embodiments display) further system defined regions of interest, this need not be the case. Further processing for image analysis may take place remotely from the image display.

Thus, embodiments of the present invention provide a computer system for determining regions of interest in a static digital image for display on a display device, the system comprising a processor configured to compare parts of an image with at least one region of interest specified by a user and to determine at least one region of interest in an image based at least in part on the degree of similarity between parts of the image and the at least one user-specified region of interest.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A computer system for determining regions of interest in a static digital image for display on a display device, the system comprising:

a processor configured to compare parts of an image with characteristics of at least one region of interest specified by a user and to determine at least one region of interest in the image based at least in part on the degree of similarity between regions of the image and the at least one user-specified region of interest in which the at least one user-specified region of interest is specified from the same image as the image in relation to which the determination is made.

2. A computer system according to claim 1, in which the at least one user-specified region of interest is specified by a user defining a border of a region of interest.

3. A computer system according to claim 1, in which the at least one user-specified region of interest is specified by a user selecting at least one region of interest type from a plurality of available regions of interest types.

4. A computer system for determining regions of interest in a static digital image for display on a display device, the system comprising:

a processor configured to compare parts of an image with characteristics of at least one region of interest specified by a user and to determine at least one region of interest in the image based at least in part on the degree of similarity between regions of the image and the at least one user-specified region of interest in which the at least one user-specified region of interest is specified from the same image as the image in relation to which the determination is made, in which the degree of similarity is determined by projecting at least part of the at least one user-specified region of interest into a feature space and comparing the distance in feature space between the at least one user-specified region of interest with regions of the image in relation to which the determination is to be made.

5. A computer system according to claim 4, in which a resolution pyramid is formed from the image, which resolution pyramid is segmented at different resolutions.

6. A computer system according to claim 4, in which feature vectors are projected in to a feature space.

7. A computer system according to claim 6, in which the feature vectors include variables selected from colour, feature and gradient image profiling of the neighbourhood surrounding points in the at least one user-specified region of interest.

8. A computer system according to claim 4, in which the degree of similarity is determined according to the response of a face detection system.

9. An apparatus for the display of static digital images comprising a computer system according to claim 1 to determine a region of interest for display and a display device for displaying the region of interest.

10. A method of determining a region of interest in a static digital image for display on a display device, the method comprising the steps of:

comparing, using a processor, parts of an image with at least one region of interest specified by a user;

determining at least one region of interest in an image based at least in part on the degree of similarity between parts of the image and characteristics of the at least one user-specified region of interest in which the at least one user-specified region of interest is specified from the same image as the image in relation to which the determination is made.

11. A method of displaying a static digital image, which method comprises the steps of determining a region of interest in an image according to claim 10 and displaying the region of interest.

12. A computer programmed to carry out the method of claim 10.

13. The method of claim 10, in which the degree of similarity is determined by projecting at least part of the at least one user-specified region of interest into a feature space and comparing the distance in feature space between the at least one user-specified region of interest with regions of the image in relation to which the determination is to be made.

* * * * *